United States Patent Office 2,790,293
Patented Apr. 30, 1957

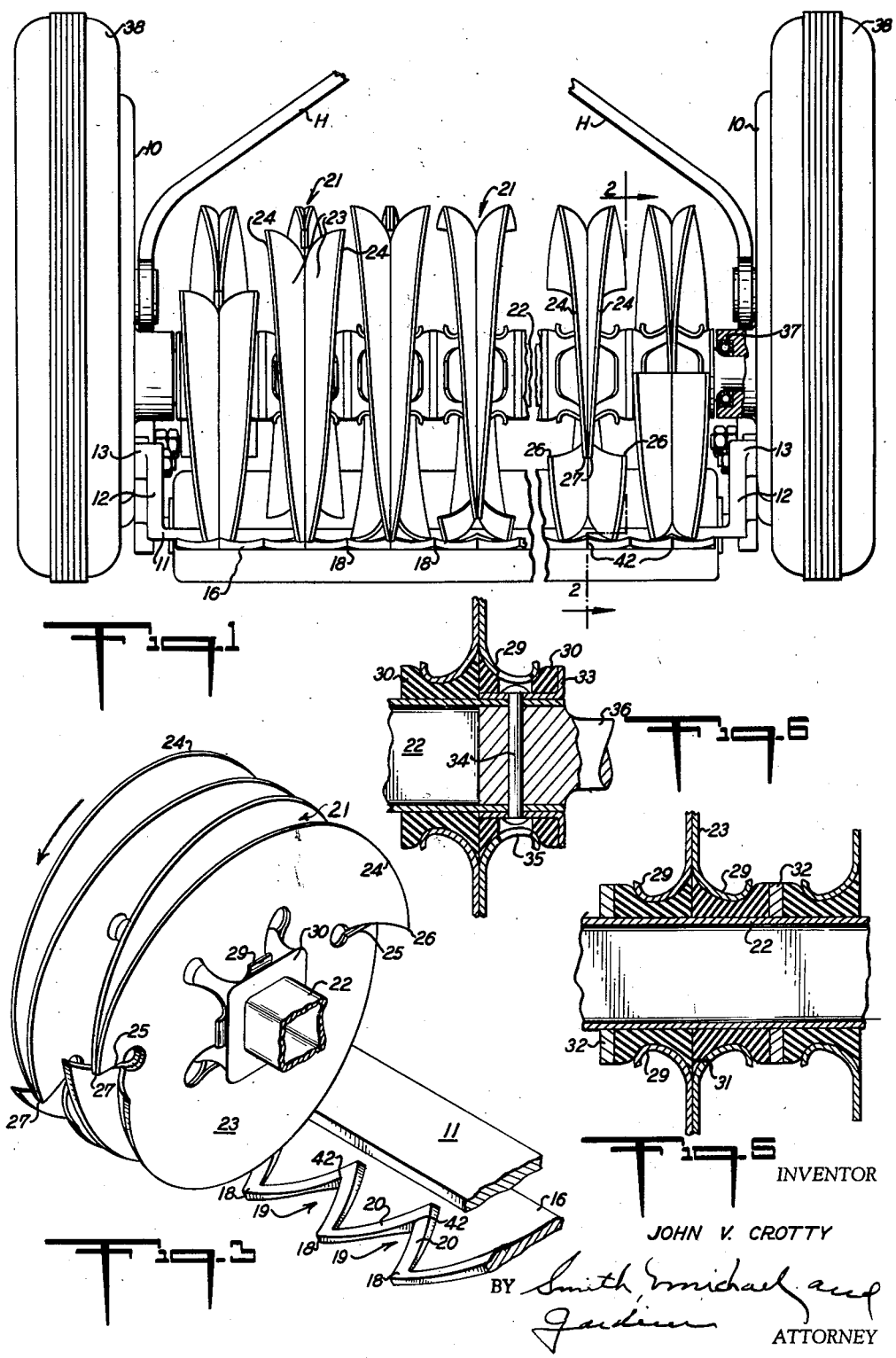

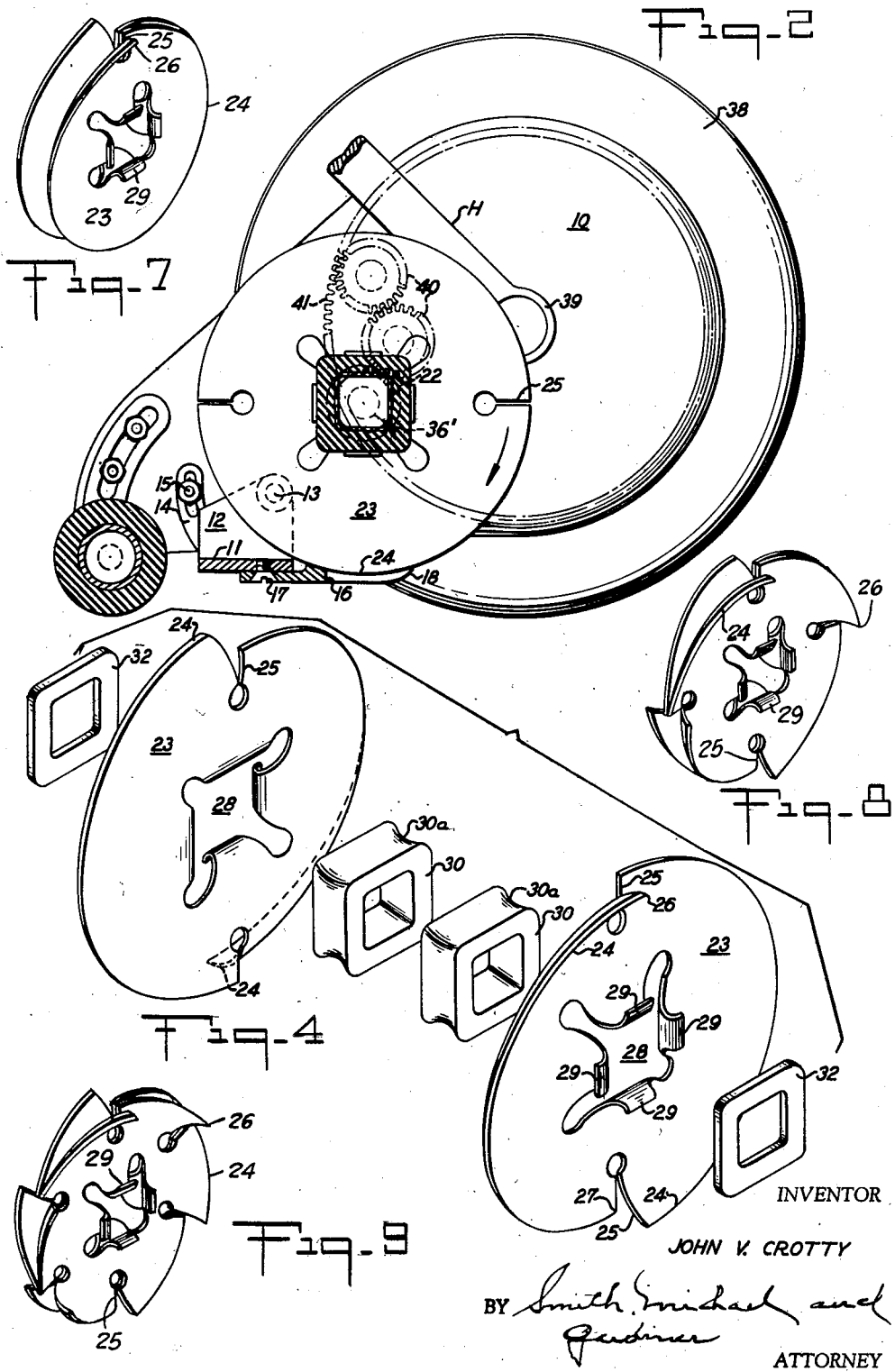

2,790,293

ROTARY CUTTING MECHANISM INCLUDING COOPERATING TOOTHED STATIONARY CUTTER BAR

John V. Crotty, Fort Worth, Tex.

Application March 30, 1956, Serial No. 575,086

16 Claims. (Cl. 56—249)

This invention is a rotary cutter mechanism designed particularly for mowing machines adapted to be propelled over a lawn or other grass covered area.

Rotary cutter mechanisms have previously been designed for lawn mowers but many existing designs possess inherent objectionable features due primarily to the absence of means which will insure a substantial continuous 360° smooth cutting action. This results in a rough and unsightly appearance in the lawn after cutting, particularly when the grass to be cut is tall and dense.

With these facts in mind, the primary object of the present invention is to provide an improved rotary type cutting mechanism for mowers which will effect a substantially continuous uniform shearing action in operation as opposed to the intermittent cutting or chopping type of action that occurs in operation of conventional disc-type and reel-type mowers.

Another object of the invention is to provide a cutting mechanism employing rotary cutter means in which a plurality of blade elements having cutting edges which lie in a substantially cylindrical surface and which are adapted to cooperate with a toothed stationary cutter bar provide continuous, uniform shearing of the grass when the mower is in operation.

Another object of the invention is to provide in an apparatus of the character described, plural spirally disposed cutting elements arranged in juxtaposed balanced pairs and in shearing relation to a toothed cutter bar in a manner such that dual balanced shearing forces result from the action of each such pair to thus insure a balanced cutting load on the mower at all times.

Another object of the invention is to provide rotary cutters in the form of discs, having spirally flared peripheral cutting edges, the discs being arranged in juxtaposed pairs with the flared cutting edges of each pair aligned longitudinally of the axis of rotation thereof and the cutting edges thereof flared in opposite directions away from a medial plane between the discs.

Another object of the invention is to provide in an apparatus of the character described, means for resiliently mounting the discs to permit tilting thereof with respect to their axis of rotation when sticks, stones or other foreign objects are encountered during operation of the mower to thus preclude damage to the discs.

Another object of the invention is to provide in an apparatus of the class described, a toothed cutter bar having forwardly open substantially V-shaped notches defined by rearwardly convergent cutting edges and a rotary cutter member including pairs of oppositely flared spiral cutting edges, the cutting edges of respective pairs being designed to engage concurrently the convergent cutting edges of the respective notches of the cutter bar and move in a shearing action progressively therealong forwardly from the apex of the V-shaped notch to thereby insure balanced dual shearing forces at all times.

Still another object of the invention is to provide a cutting mechanism of the type described herein which in operation, does not generate undesirable air currents that could cause the grass or other vegetation being cut to be blown away from the cutting elements.

These and other objects of the invention will become apparent from a consideration of the following specification and drawings wherein has been illustrated a preferred form of the invention and wherein Fig. 1 is a front elevation of a lawn mower with parts in section and parts broken away, embodying the cutting mechanisms of the present invention;

Fig. 2 is a transverse sectional view on line 2—2 of Fig. 1;

Fig. 3 is a fragmental perspective view showing the relationship of the rotary cutting discs to the toothed cutter bar;

Fig. 4 is an exploded perspective view showing the manner in which the discs and resilient bushings are assembled on the cutter shaft;

Fig. 5 is an enlarged fragmental detailed view in section showing the arrangement of the discs and resilient bushings;

Fig. 6 is a view similar to Fig. 5 showing the manner in which the shaft is attached to the drive mechanism therefor;

Figs. 7, 8 and 9 are perspective views of modified forms of cutters having cutting edges which are of 360°, 90°, and 60° in arcuate extent, respectively.

Referring more particularly to the accompanying drawings wherein like reference numerals are used to designate like parts throughout, the mower of the present invention comprises a pair of side frame members 10—10. The frame members 10—10 may be connected in spaced relation by means including a cutter bar support 11, said bar being provided with end hanger members 12 which are pivotally mounted at 13 to the side frames 10. A suitable slotted lug 14 and lock nut 15 may be provided to adjust the position of the cutter bar support 11, about the axis of the pivots 13 to thereby properly position a stationary bar 16 with respect to the rotary cutter assembly to be described. The cutter bar 16 may be secured to the cutter bar support 11 in any conventional manner such as by screws 17. The cutter bar 16 at its forward edge is provided with a longitudinal series of teeth 18 separated by notches 19. The notches are defined by opposed cutting edges 20 which converge rearwardly from the forward edge of the bar 16 to the deepest point of the notch. Preferably, the notches 19 are generally V-shaped as shown and the teeth 18 generally triangular in form. The cutting edges 20 are preferably upset or raised above the general plane of the cutter bar 16 as shown in Fig. 3 and that portion of the cutter bar occupied by the teeth 18 and the notches 19 is generally arcuate from front to back, the arc of such curvature being concentric to the axis of rotation of the rotary cutter assembly about to be described.

A rotary cutter assembly is mounted within the frame of the mower to cooperate with the stationary cutter bar 16 and the cutting edges 20 thereof. The rotary cutter assembly comprises plural pairs of cutting discs, the pairs of discs being indicated by the reference character 21. The pairs of discs 21 are mounted upon a shaft 22 which in turn is mounted for rotation within the side frame members 10. The shaft 22 is preferably noncircular in form as shown and may be hollow to reduce weight if desired. The individual discs 23 of each pair of discs 21 are clearly shown in Figs. 3 and 4, each such disc 23 being provided with one or more spirally flared peripheral cutting edges 24. As will appear from the description which follows, the flared peripheral cutting edge of the discs may have an arcuate extent of 360° or any fractional part thereof such as 180°, 90° or 60°, such as shown in Figs. 7, 3, 8 and 9, respectively depending upon whether there are 1, 2, 4 or 6 sector-shaped segments formed in the disc.

For the sake of illustration, the discs are shown each provided with two peripheral cutting edges, each of substantially 180° arcuate extent. The discs are preferably made from sheet steel and may be formed in any conventional manner such as by radially slitting the discs as at 25 to form the desired number of sector-shaped segments and then displacing one corresponding end 26 of each of the peripheral edges of the several sectors outwardly from the plane of the disc while retaining the other ends 27 of said cutting edges substantially within the plane of the disc as clearly shown in the drawings. The adjacent ends of the edges of successive segments of a given disc are substantially in radial alignment as shown thus to insure substantially 360° cutting action for each disc. The degree and direction of the flare or displacement of the ends 26 of the disc segments corresponds to the direction and extent of obliquity of the respective cutting edges 20—20 of the cutter bar with which said discs cooperate, as will be hereinafter explained. Furthermore, the discs are identical in construction except that the cutting edges of paired discs are flared in opposite directions away from a medial plane between the disc and perpendicular to the axis of shaft 22.

Each of the discs is centrally apertured as at 28 to receive the shaft 22 and the walls surrounding and defining said apertures are provided with resilient tongues 29 arranged in diametrically opposed pairs and extending laterally an appreciable distance out of the plane of the disc and in the same direction as the portions 26 of the edge are flared. These resilient tongues 29 cooperate with resilient bushings 30 interposed between the respective discs and the shaft 22 as clearly shown in Fig. 5 to resiliently support the discs from the shaft so as to permit tilting or wobbling of the discs in the event some foreign object is encountered during operation of the mower which will not pass readily through the machine. As shown in Figs. 1 and 3, the discs 23 of each pair of discs are arranged back to back and symmetrically with a respect to a medial plane perpendicular to the axis of shaft 22 with the spirally-flared cutting edges 24 of the several edge segments aligned longitudinally of the shaft. The spirally flared portions 26 of the cutting edges of each pair are disposed in opposite directions with respect to the medial plane of the discs. Preferably, as shown in Fig. 1, the pairs of discs 21 are angularly staggered progressively from one end of the shaft to the other so that a line drawn through the outer ends of corresponding radial slits 25 of successive pairs of discs would define a spiral. This further tends to insure a balanced uniform load on the mower at all times.

In assembling the discs 23 upon the shaft 22 as shown in Figs. 4 and 5, shock absorbing resilient bushings 30 are fitted snug upon the shaft 22, it being noted that bushings 30 have the same general interior noncircular form as the shaft 22, and that two such bushings are assembled back to back on the shaft for each pair of discs 23 as shown in Fig. 5. The discs 23 are then mounted upon the bushings with the spring fingers 29 of the discs seating within the arcuate concavity 30ª formed in the outer surface of the body of the bushings in a manner to position the discs substantially perpendicularly to the axis of the shaft and with the discs disposed back to back with the contacting faces of the discs and bearings lying within a medial plane passing perpendicularly through the shaft 22 as shown in Fig. 5. Between each assembled pair of discs and bushings, a substantially square spacing washer 32 is preferably employed and when all bushings 30, washers 32 and pairs of discs 21 have been thus assembled, the assembly is compressed endwise longitudinally of the shaft to insure that all bushings are in engagement end to end and the discs of each pair are in contact back to back.

The discs 23, bushings 30 and washers 32 are thus assembled on shaft 22 are retained in position by thrust cups 33 mounted on the shaft at opposite ends thereof and secured thereto by rivets 34. The tongues 29 and the bushings 30 of the terminal discs may be apertured as at 35, if desired, to facilitate placing the rivet 34, as shown in Fig. 6.

Any conventional means may be provided for mounting the cutter assembly for rotation with respect to the stationary cutter bar and to this end the shaft 22 may be provided at opposite ends with stub shafts 36 having noncircular ends entered within the ends of hollow shaft 22 and secured therein by said rivets 34, as shown. The stub shafts 36 extend through openings in the end frame members 10 and are journaled therein for rotation by bearings shown generally at 37. The stub shafts 36 terminate within hollow traction wheels 38 mounted for rotation on journals 39 carried by the frames 10 in a conventional manner. Within the hollow traction wheels 38, the stub shafts 36 are provided with driving pinions 36' which are connected by gears 40 mounted on the inner face of the frame members 10, to ring gears 41 carried by the traction wheels 38. The driving gear train between the ring gear 41 and the pinion carried by the stub shaft 36 is conventional and may include a one-way clutch (not shown) so that the rotary cutter mechanism is driven only when the direction of the mower is forward. The driving gear train is such as to provide rotation of the rotary cutter assembly in a direction of the arrow as shown in Fig. 2. The cutter assembly is mounted within the side frame members so that the medial planes of the several pairs of discs 21 pass through the points of maximum convergence 42 of the cutting edges 20 of the cutter bar 16 and where the notches 19 are V-shaped, the point 42 is at the apex of the V.

The axis of rotation of the shaft 22 and the dimension of the discs 23 are such as to dispose the spirally flared cutting edges of the discs in shearing relation to the cutting edges 20 of the cutter bar 16. With the respective discs of each pair arranged as described, it is apparent that as the rotary cutter assembly is rotated forwardly and downwardly as viewed in Fig. 1, the aligned contacting ends 27 of the discs of any pair will first engage the point 42 of a corresponding notch 19 of the cutter bar and as the cutter assembly continues to rotate, the oppositely flared spiral edges 24 of said pair of discs will simultaneously shearingly engage the cutting edges 20—20 of said notch progressively from the point 42 outwardly to the tips of the adjacent teeth 18. Thus the forces incident to this dual shearing action are balanced for each pair of discs. As previously stated, the extent and direction of the flared cutting edges 24 for each pair of discs corresponds to the direction and extent of obliquity of the cutting edges 20—20 and the aligned leading ends 27—27 of the cutting edges are in substantial radial alignment with the flared trailing ends 26—26 of the preceding pair of cutting edges so that there is a substantially continuous balanced dual shearing action throughout the entire 360° of rotation of the cutter assembly.

The mower may be propelled over the area to be cut by any convenient handle means shown at H, or if desired conventional motor means may be mounted on the mower frame so that the mower may be power driven.

It will be apparent from the foregoing description that the mower of the present invention provides a substantially continuous balanced 360° shearing cut in contrast to the operation of known disc type mowers which cut only on one-half of the cutter revolution or alternately on opposite sides of a tooth on the cutter bar.

Also by arranging the shearing action to proceed from the base of the teeth outwardly or forwardly in the direction of mower movement, the grass is cut continuously and evenly and the load on the mower at all times is light in contrast to known machines in which the cutting discs operate in a manner to cut from the point of the cutter bar teeth to the base thereof and counter to the direction of mower movement. By this known arrangement the discs urge the grass into the apex of the notch in the cutter bar with the result that it is cut in bunches or tufts, resulting in a rough appearance to the finished lawn.

Furthermore, by the novel resilient mounting of the discs as described, they are individually protected against injury and distortion due to encountering foreign objects while the mower is in operation. Due to the back to back relationship of the discs in each pair and the oppositely directed tongue members 29 carried by the discs and engaging the resilient bushings 30, each disc of a pair tends to reposition its associated disc when one or the other thereof has been displaced due to encountering a foreign object in operation.

It will be understood that the foregoing description and accompanying illustrations are but for the purpose of example only and that various changes may be made in the size, proportion and arrangement of parts without departing from the spirit of the invention which is set forth more clearly in the appended claims.

I claim:

1. A mower comprising spaced side frame members, a cutter bar member extending transversely between said side frame members and including forwardly directed teeth, adjacent teeth being separated by forwardly open notches defined by opposed rearwardly converging cutting edges, a shaft journaled above said cutter bar member for rotation about an axis generally parallel to said cutter bar member, and a plurality of cutting discs mounted on said shaft, the peripheral edge of each disc having a portion flared out of the general plane of the disc to provide a spiral cutting edge, said discs being arranged in pairs with the spiral cutting edges of the discs of each pair flared in opposite directions and aligned longitudinally of the shaft, the respective pairs of discs being spaced longitudinally of the shaft with the discs of the respective pairs being symmetrically disposed with respect to medial planes passing perpendicularly through the shaft and through the point of maximum convergence of the cutting edges of the respective notches in the cutter bar member, the discs being dimensioned to dispose the spiral cutting edges thereof in shearing relation to the converging cutting edges of the cutter bar member and means for rotating the shaft.

2. The mower described in claim 1 wherein the notches in the cutter bar member are generally V-shaped and the cutting edges thereof extend divergently forward from the apex of the V with adjacent edges of adjacent notches intersecting at the forward extremity of the intervening teeth.

3. The mower described in claim 1 wherein each disc is provided with a series of sector-shaped segments and each segment is provided with a spirally flared cutting edge, the direction and extent of the flare corresponding to the direction and extent of the obliquity of the corresponding cutting edge of the cutter bar member.

4. The mower described in claim 3 wherein the leading end of the spirally flared cutting edge of each segment of a disc is in substantial radial alignment with the trailing end of the cutting edge of the next adjacent segment of the disc.

5. In a mower of the character described, a stationary cutter bar member having a forwardly open notch defined by opposed rearwardly converging cutting edges, a rotary cutter member having a pair of circumferentially extending oppositely flared spiral cutting edges respectively disposed in shearing relation to the opposed cutting edges of the cutter bar notch and means for rotating the rotary cutter member thereby to move said spirally flared cutting edges thereof simultaneously in shearing relation with the opposed cutting edges of the notch in the cutter bar member.

6. The mower described in claim 5 wherein the circumferential extent of the cutting edges and the axial extent of the spiral flare of the cutting edges are so proportioned and the direction of rotation of the rotary cutter member is such that the shearing action between the cutters begins at the point of maximum convergence of the cutting edges of the cutter bar member and continues forwardly simultaneously along both said cutting edges substantially throughout the full circumferential extent of the rotary cutter member.

7. The mower described in claim 5 wherein the rotary cutter member is provided with plural pairs of spirally flared circumferentially extending cutting edges arranged with the cutting edges of each pair aligned axially, said pairs of cutting edges being spaced circumferentially of the rotary cutter member and symmetrically disposed with respect to the notch in the cutter bar whereby the cutting edges of each pair successively engage simultaneously the converging cutting edges of the cutter bar notch.

8. The mower described in claim 7 wherein the notch in the cutter bar is substantially V-shaped and wherein the axially aligned flared cutting edges of each such pair converge in the direction of rotation of the cutter member, from a point of maximum separation to a point of minimum separation lying substantially within a plane passing through the apex of the notch in the cutter bar and perpendicular to the axis of rotation of the rotary cutter member, whereby to successively shearingly engage the opposed edges of the cutter bar notch simultaneously, and to move outwardly therealong from the point of maximum convergence thereof.

9. In a mower, a stationary cutter bar having forwardly open notches defined by rearwardly convergent cutting edges, a shaft mounted for rotation about an axis above and substantially parallel to said cutter bar member, a plurality of cutting discs mounted on the shaft and secured thereto against relative rotation, said cutting discs having peripheral cutting edges disposed in shearing relation to the cutting edges of the cutter bar and means resiliently supporting the discs on said shaft for limited lateral and radial displacement with respect thereto.

10. In a mower, a stationary cutter bar having forwardly open notches defined by rearwardly convergent cutting edges, a shaft mounted for rotation about an axis above and substantially parallel to said cutter bar member, a plurality of cutting discs mounted on the shaft and having peripheral cutting edges disposed in shearing relation to the cutting edges of the cutter bar, said discs being centrally apertured and arranged in pairs back to back with the shaft passing through said apertures, resilient bushings interposed between the shaft and discs, laterally directed resilient tongues carried by the discs, said tongues being arranged in opposed pairs and extending generally axially of the shaft and engaging the bushings with the plane of the discs being substantially perpendicular to the axis of the shaft.

11. The mower described in claim 10 wherein the discs of each pair are in contact in a common plane perpendicular to the axis of the shaft and wherein said tongues extend from said discs in opposite directions along the shaft.

12. In a mower, a stationary cutter bar having a transverse series of forwardly open notches, each said notch being defined by opposed rearwardly converging cutting edges, a rotary cutter assembly mounted for rotation about an axis above and substantially parallel to said cutter bar, said rotary cutter assembly including plural pairs of spiral cutting elements, the cutting elements of each said pair being axially aligned and disposed symmetrically with respect to but flared in opposite directions from medial planes perpendicular to the axis of rotation of the rotary cutter assembly and passing through the points of maximum convergence of the cutting edges of the respective notches of the cutter bar, there being plural pairs of spiral cutting elements so associated with each said plane and disposed in a circumferentially spaced series on the rotary cutter assembly with said spiral cutting elements converging in the direction of rotation of the rotary cutter assembly, from a point of maximum separation to a point of minimum separation lying substantially within the respective planes, and means for rotating the rotary cutter assembly.

13. The mower described in claim 12 wherein the leading ends of each pair of cutting elements in a circumferential series and the trailing ends of the cutting edges of the next adjacent pair of cutting elements in said series lie substantially within a common plane passing radially through the axis of rotation of a rotary cutter assembly.

14. The mower described in claim 12 wherein corresponding pairs of cutting elements in the several circumferential series are spirally staggered from one end of the rotary cutter assembly to the other.

15. In a mower of the character described, a stationary cutter bar member having a forwardly open notch defined by opposed rearwardly converging cutting edges, a rotary cutter member including a pair of discs each having a peripheral spirally flared cutting edge, means for mounting the rotary cutter member for rotation about an axis substantially parallel to the cutter bar member, said discs being disposed on said rotary cutter member in face to face relation with the adjacent faces thereof lying substantially within a common plane perpendicular to the axis of rotation of the rotary cutter member and passing through the point of maximum convergence of the cutting edges of the notch in the cutter bar member, with the cutting edges of said discs aligned longitudinally of the rotary cutter member and flaring outwardly in opposite directions from said plane.

16. In a mower, a stationary cutter bar having forwardly open notches defined by rearwardly convergent cutting edges, a shaft mounted for rotation about an axis above and substantially parallel to said cutter bar member, a plurality of cutting discs mounted on the shaft and secured thereto against relative rotation, said cutting discs having peripheral cutting edges disposed in shearing relation to the cutting edges of the notches in said cutter bar member, said discs being centrally apertured and arranged in pairs in face to face relation, said shaft passing through said apertures, and means for resiliently supporting the discs on said shaft for limited lateral and radial movement including resilient bushings interposed between the shaft and said discs.

References Cited in the file of this patent

UNITED STATES PATENTS

| | | |
|---|---|---|
| 2,484,071 | Brauer | Oct. 11, 1949 |
| 2,539,619 | Goodall | Jan. 30, 1951 |
| 2,619,786 | Ream | Dec. 2, 1952 |